(12) United States Patent
Arilla et al.

(10) Patent No.: US 11,587,342 B2
(45) Date of Patent: *Feb. 21, 2023

(54) USING ATTRIBUTES FOR IDENTIFYING IMAGERY FOR SELECTION

(71) Applicant: SOCIAL NATIVE, INC., Beverly Hills, CA (US)

(72) Inventors: Luis Arilla, New York, NY (US); Esteban Del Boca, Cordoba (AR); Sampo Juhani Kaasila, Plaistow, NH (US); Rubén Ezequiel Torti López, Cordoba (AR); Nicolás Rubén Tomatis, Cordoba (AR)

(73) Assignee: SOCIAL NATIVE, INC., Beverly Hills, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/122,832

(22) Filed: Dec. 15, 2020

(65) Prior Publication Data

US 2021/0350190 A1 Nov. 11, 2021

Related U.S. Application Data

(63) Continuation of application No. 15/717,295, filed on Sep. 27, 2017, now Pat. No. 10,909,429.

(51) Int. Cl.
| | |
|---|---|
| *G06K 9/00* | (2022.01) |
| *G06V 30/194* | (2022.01) |
| *G06K 9/62* | (2022.01) |
| *G06N 20/00* | (2019.01) |
| *G06Q 30/02* | (2023.01) |
| *G06Q 30/0241* | (2023.01) |

(Continued)

(52) U.S. Cl.
CPC ......... *G06V 30/194* (2022.01); *G06K 9/6256* (2013.01); *G06K 9/6267* (2013.01); *G06N 20/00* (2019.01); *G06Q 30/02* (2013.01); *G06Q 30/0276* (2013.01); *G06V 10/56* (2022.01); *G06V 20/63* (2022.01)

(58) Field of Classification Search
CPC ...... G06V 30/194; G06V 10/56; G06V 20/63; G06V 30/19173; G06K 9/6256; G06K 9/6267; G06N 20/00; G06Q 30/02; G06Q 30/0276

See application file for complete search history.

(56) References Cited

U.S. PATENT DOCUMENTS

| | | | | |
|---|---|---|---|---|
| 10,157,332 B1* | 12/2018 | Gray | ............ | G06T 11/60 |
| 2008/0118151 A1* | 5/2008 | Bouguet | ............ | G06K 9/6253 |
| | | | | 382/181 |

(Continued)

*Primary Examiner* — Ping Y Hsieh
(74) *Attorney, Agent, or Firm* — Procopio, Cory, Hargreaves & Savitch LLP

(57) ABSTRACT

A system includes a computing device that includes a memory configured to store instructions. The system also includes a processor to execute the instructions to perform operations that include receiving data representing an image, the image being represented in the data by a collection of visual elements. Operations also include determining whether to select the image for presentation by one or more entities using a machine learning system, the machine learning system being trained using data representing a plurality of training images and data representing one or more attributes regarding image presentation by the one or more entities.

20 Claims, 10 Drawing Sheets

(51) Int. Cl.
*G06V 10/56* (2022.01)
*G06V 20/62* (2022.01)

(56) References Cited

U.S. PATENT DOCUMENTS

| | | | | |
|---|---|---|---|---|
| 2008/0243837 | A1* | 10/2008 | Davis | G06F 16/93 |
| | | | | 707/999.005 |
| 2009/0171766 | A1* | 7/2009 | Schiff | G06Q 30/0244 |
| | | | | 705/14.69 |
| 2009/0290813 | A1* | 11/2009 | He | G06F 16/5838 |
| | | | | 382/305 |
| 2015/0036919 | A1* | 2/2015 | Bourdev | G06Q 50/01 |
| | | | | 382/156 |
| 2018/0332140 | A1* | 11/2018 | Bullock | G06Q 30/0201 |
| 2019/0073537 | A1* | 3/2019 | Arilla | G06F 16/51 |
| 2019/0156193 | A1* | 5/2019 | Jaroch | H04L 67/10 |

* cited by examiner

USING ATTRIBUTES FOR IDENTIFYING IMAGERY FOR SELECTION

CROSS-REFERENCE

This application is a Continuation of U.S. application Ser. No. 15/717,295, filed Sep. 27, 2017, which is incorporated herein by reference in its entirety.

BACKGROUND

This description relates to identifying images associated with particular subjects that may be of interest to particular entities and individuals. Attributes of the images can be used to identify such images for selection and potentially presentation.

Proportional to the astronomical growth of imagery presented over the Internet, the demand for such content has grown. Online viewers have grown accustomed to being presented a large variety of imagery when reviewing products, services, etc. While professionally prepared imagery is used to present viewers with such visuals, nonprofessionally prepared imagery can be used for presentation.

SUMMARY

The systems and techniques described can aid individuals such as designers (e.g., website designers), marketers (e.g., marketing particular brand products, services), etc. with selecting imagery for presentation to viewers (e.g., end users, potential purchasers, etc.). Employing machine learning techniques, imagery can be identified that is likely to be eye—catching (e.g., to end users) and cause a positive reaction (e.g., initiate a transaction). By training a machine learning system with images that contain desirable attributes (e.g., as determined by designers, marketers, from previous imagery, etc.), other images with similar attributes can be selected for possible presentation while images with undesired attributes can be removed from consideration. Such attributes can be defined, for example by a brand, an individual associated with the brand (e.g., designer, marketer), etc. Rather than being predefined, such attributes can be developed by training the machine learning system with images previously selected, previously rejected, etc. for selecting similar images for presentation by the brand. Such a technique can substantially reduce the amount of time, resources, etc. needed for identifying desirable images that may be selected for publication.

In one aspect, a computing device implemented method includes receiving data representing an image, the image being represented in the data by a collection of visual elements. The method also includes determining whether to select the image for presentation by one or more entities using a machine learning system, the machine learning system being trained using data representing a plurality of training images and data representing one or more attributes regarding image presentation by the one or more entities.

Implementations may include one or more of the following features. The one or more attributes may represent whether each of the training images was presented by one or more of the entities. The one or more attributes may represent one or more graphical attributes and one or more content attributes. The one or more attributes may be are entered into a webpage by the one or more entities. The machine learning system may provide data representing the one or more attributes of the image. The machine learning system may provide data representing whether the image is selectable for presentation by each of the one or more entities. At least one of the training images may include two or more of the attributes. At least one of the training images may be absent all of the one or more attributes. One of the training images may represent one attribute and another training image may represent another attribute. A portion of the training images may have been previously rejected. A portion of the training images may have been previously published. The machine learning system may also be trained on performance data. The machine learning system may provide data representing the predicted performance of the image. The method may also include further training of the machine learning system using data associated with another image selected for publication. The graphical attributes may represent one or more colors included in a corresponding image of the plurality of training images. The content attributes may represent whether textual content is present. The content attributes may represent whether a particular item is present.

In another aspect, a system includes a computing device that includes a memory configured to store instructions. The system also includes a processor to execute the instructions to perform operations that include receiving data representing an image, the image being represented in the data by a collection of visual elements. Operations also include determining whether to select the image for presentation by one or more entities using a machine learning system, the machine learning system being trained using data representing a plurality of training images and data representing one or more attributes regarding image presentation by the one or more entities.

Implementations may include one or more of the following features. The one or more attributes may represent whether each of the training images was presented by one or more of the entities. The one or more attributes may represent one or more graphical attributes and one or more content attributes. The one or more attributes may be are entered into a webpage by the one or more entities. The machine learning system may provide data representing the one or more attributes of the image. The machine learning system may provide data representing whether the image is selectable for presentation by each of the one or more entities. At least one of the training images may include two or more of the attributes. At least one of the training images may be absent all of the one or more attributes. One of the training images may represent one attribute and another training image may represent another attribute. A portion of the training images may have been previously rejected. A portion of the training images may have been previously published. The machine learning system may also be trained on performance data. The machine learning system may provide data representing the predicted performance of the image. Operations may also include further training of the machine learning system using data associated with another image selected for publication. The graphical attributes may represent one or more colors included in a corresponding image of the plurality of training images. The content attributes may represent whether textual content is present. The content attributes may represent whether a particular item is present.

In another aspect, one or more computer readable media store instructions that are executable by a processing device, and upon such execution cause the processing device to perform operations including receiving data representing an image, the image being represented in the data by a collection of visual elements. Operations also include determining whether to select the image for presentation by one or more entities using a machine learning system, the machine learning system being trained using data representing a plurality of training images and data representing one or more attributes regarding image presentation by the one or more entities.

Implementations may include one or more of the following features. The one or more attributes may represent whether each of the training images was presented by one or more of the entities. The one or more attributes may represent one or more graphical attributes and one or more content attributes. The one or more attributes may be are entered into a webpage by the one or more entities. The machine learning system may provide data representing the one or more attributes of the image. The machine learning system may provide data representing whether the image is selectable for presentation by each of the one or more entities. At least one of the training images may include two or more of the attributes. At least one of the training images may be absent all of the one or more attributes. One of the training images may represent one attribute and another training image may represent another attribute. A portion of the training images may have been previously rejected. A portion of the training images may have been previously published. The machine learning system may also be trained on performance data. The machine learning system may provide data representing the predicted performance of the image. Operations may also include further training of the machine learning system using data associated with another image selected for publication. The graphical attributes may represent one or more colors included in a corresponding image of the plurality of training images. The content attributes may represent whether textual content is present. The content attributes may represent whether a particular item is present.

These and other aspects, features, and various combinations may be expressed as methods, apparatus, systems, means for performing functions, program products, etc.

Other features and advantages will be apparent from the description and the claims.

DETAILED DESCRIPTION

Figure 1:
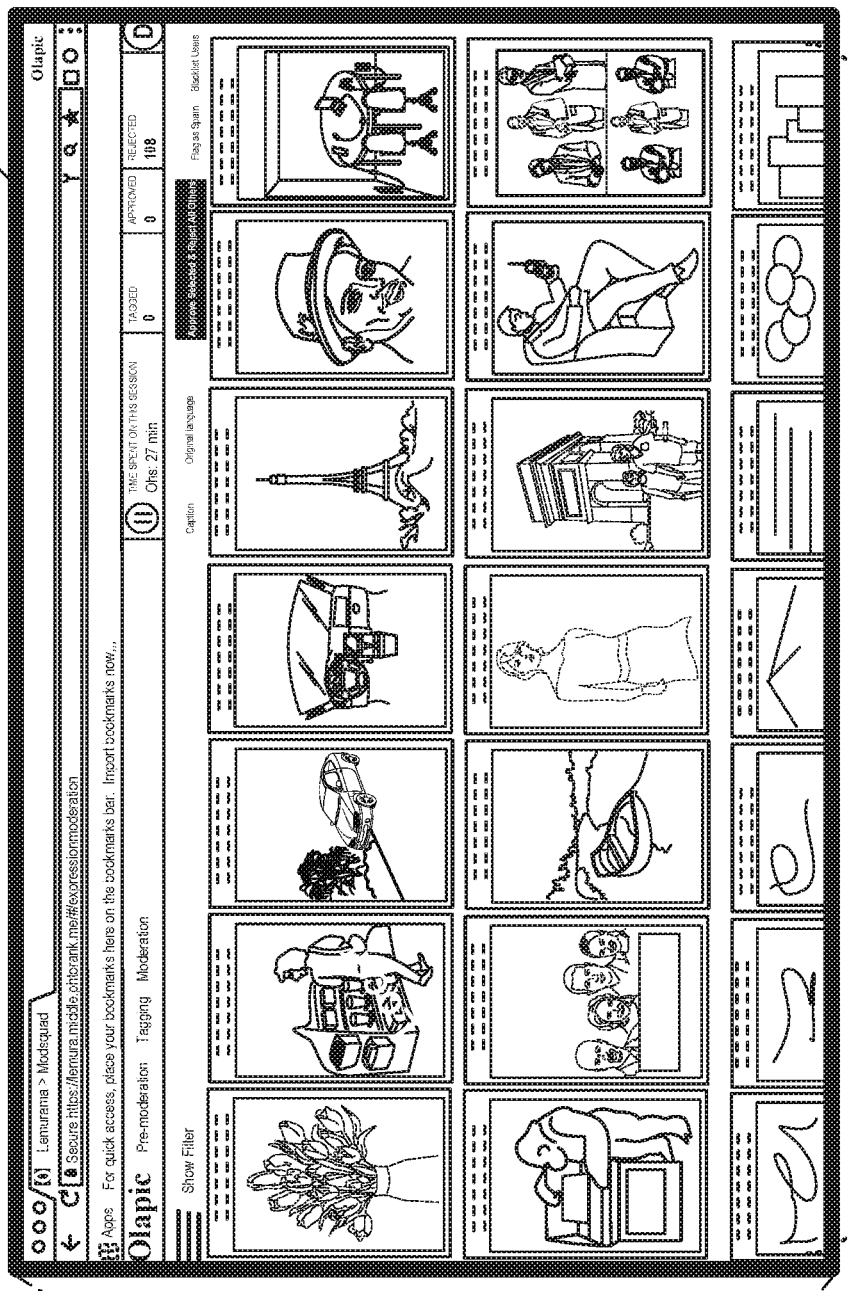
FIG. 1 illustrates a computer system presenting imagery of a website.
Figure 1:
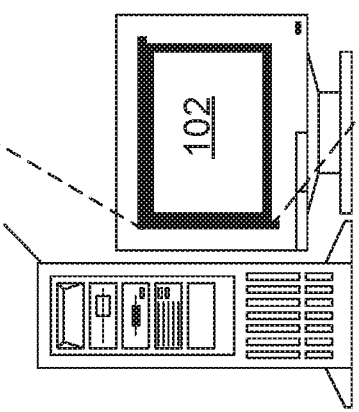

Referring to FIG. 1, a computing device (e.g., a computer system 100) includes a display 102 that allows a user to view various types of imagery for potentially selecting for a number of uses. For example, images may be selected that may be of interest to one or more entities (e.g., companies). For example, a product manufacturer, service provider, etc. (referred to as a brand) may be interested in particular types of images for various uses (e.g., presenting their products, services, etc. on the Internet). Given the nature of the brand, some types of images may be more preferred compared to other image types and a brand may develop one or more criterion that should be satisfied by each image prior to being published (e.g., placed on the brand's website, a webpage, etc.). For example, a brand involved in selling sports apparel may be interested in images that show individuals practicing sports while a hotel brand may be interested in images associated with their hotels but absent any people. Brand guidelines may develop from such criteria that can assist with selecting appropriate images for a brand. As illustrated in the figure, a website 104 is presented on the display 102 that includes a collection of selectable images 106 that individually may be of interest to one or more brands based upon guidelines of the respective brand. Even though the collection 106 is electronically presented, a considerable amount of time may be needed from an individual (e.g., a designer) to sift through all the images, apply the guidelines for one or more brands, and identify which images may be of interest to one or more of the brands. For example, the individual may need to painstakingly scroll through the collection 106 over a considerable time period (e.g., hours, tens of hours, etc.) to identify images of interest.

Figure 2:
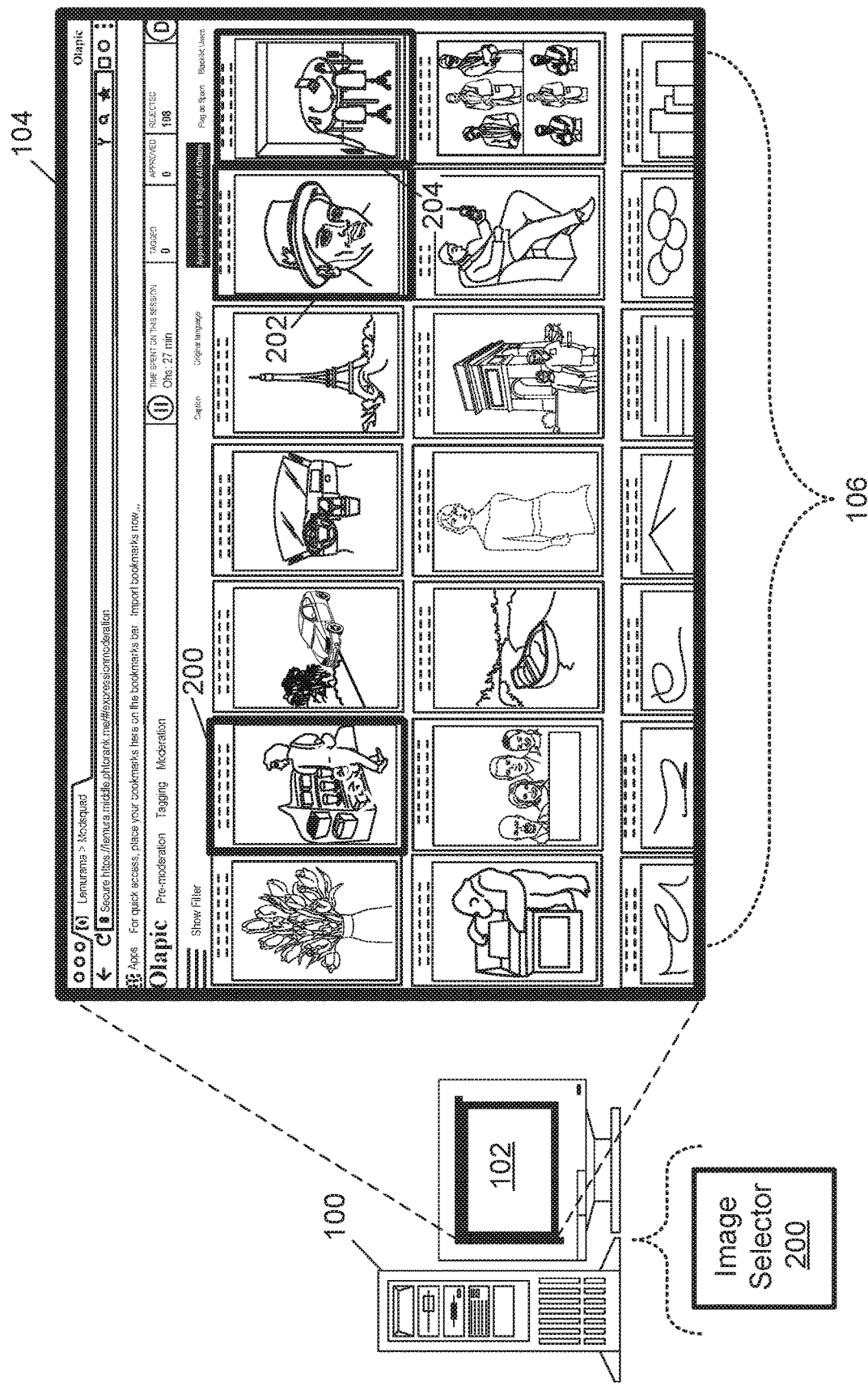
FIG. 2 illustrates a computer system presenting imagery selected for a brand.

Referring to FIG. 2, in one arrangement images found to satisfy or not to satisfy a brand's guideline may be selected (e.g., satisfying images can be selected for presented, non-satisfying images rejected from consideration). In the illustrated example, three images 200, 202, and 206 have been selected (as respectively highlighted by a graphical box surrounding the corresponding image) as not satisfying a brand's guideline. For this particular guideline, the brand is not interested in presenting any imagery that contains text, and based on this criterion each of the images 200, 202 and 206 have been marked for removal. To reduce time and improve the efficiency to identify images of interest (e.g., images absent text) from the collection 106, an image selector 200 is executed by the computer system 100. One more techniques may be employed by the image selector 200 to provide such functionality; for example, artificial intelligence techniques may be employed for image identification. Machine learning techniques such as deep learning can used by the image selector 200 to improve selection processes through training the systems (e.g., expose multi-layer neural networks to training data, feedback, etc.).

Figure 3:
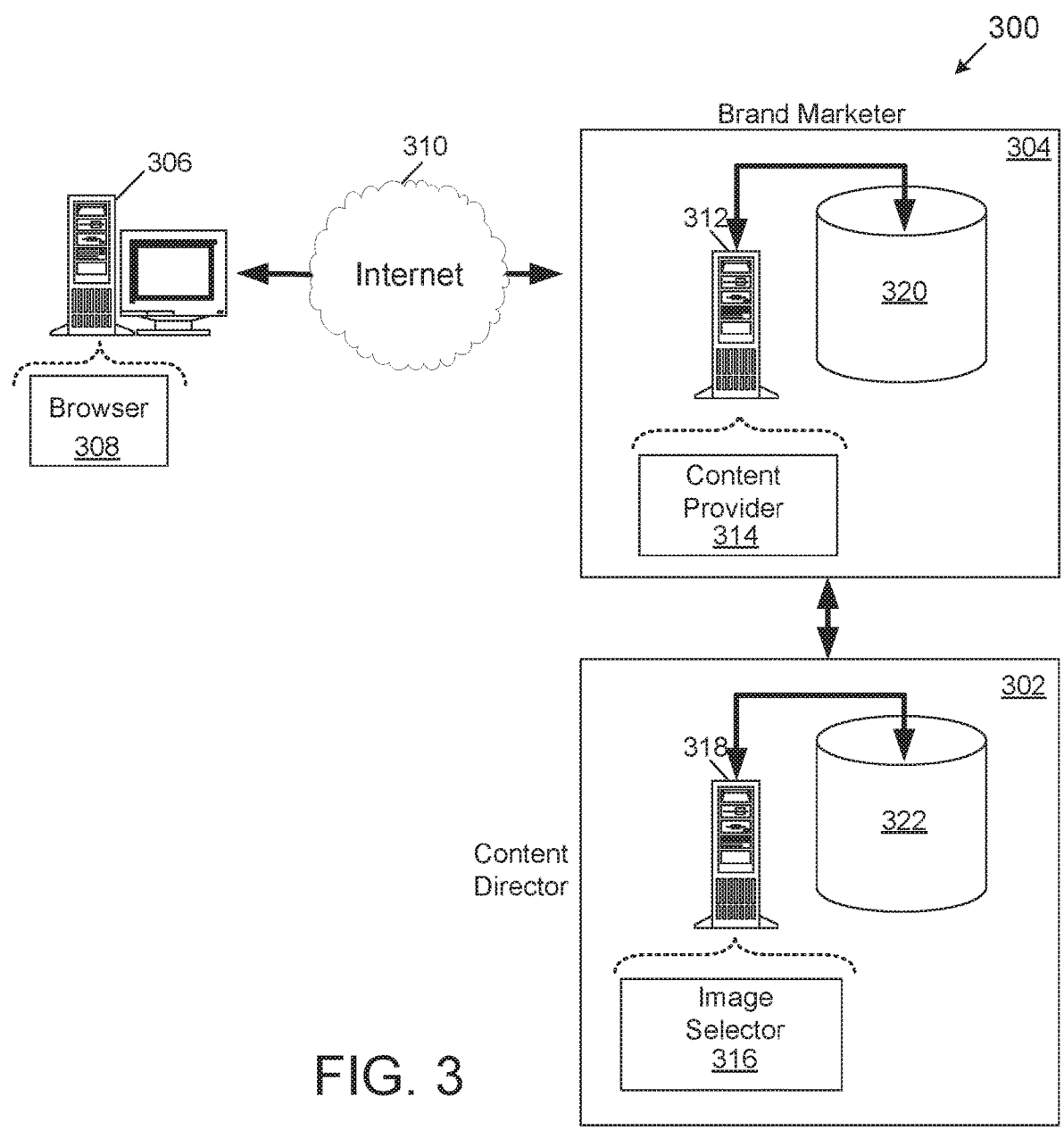
FIG. 3 is a block diagram of a network environment including a content director that selects imagery for entities.

Referring to FIG. 3, a network architecture 300 is presented that includes a content director 302 that identifies appropriate content (e.g., imagery) for one or more entities (e.g., a brand marketer 304, a brand owner, etc.) to present their products, services, etc. to end users (e.g., a computer system 306 executes a browser 308 to present selected imagery via the Internet 310). In this example, a computer system 312 executes a content provider 314 at the site of the brand marketer 304 to provide the imagery and related information to the end user. In some arrangements, other network architectures may be employed; for example, one or more publishers may be intermediaries between the brand marketer 304 and end users. In this example, an image selector 316 (similar to the image selector 200 shown in FIG. 2) is executed by a computer system 318 (at the site of the content director 302) that performs operations on imagery (e.g., selection, predict performance, collect and use feedback regarding presented images, etc.) and directs delivery of the imagery to the brand marketer 304 (e.g., for possible selection for presentation, for storing in a storage device 320, etc.). Data representing images, selected images, associated information (e.g., predicted performance of images) may also be stored at the content director 302 (e.g., in a storage device 322).

To perform operations, the image selector 316 may employ one or more computational techniques; for example, one or more machine learning techniques may be used (or other artificial intelligence techniques). Through such machine learning techniques, the image selector 316 uses artificial intelligence to automatically learn and improve from experience without being explicitly programmed. Once trained (e.g., from known imagery), one or more images, representation of images, etc. can be input into the image selector 316 to yield an output. By providing information about the output back (e.g., feedback), the machine learning technique can use the output as additional training information. Other further training data can also be provided for further training. Along with using increased amounts of training data (e.g., images), feedback data (e.g., data representing user interaction with images) can further improve accuracy (e.g., predicting top performing images).

Other forms of artificial intelligence techniques may be used by the image selector 316 along with the network architecture 300. For example, to process information (e.g., images, image representations, etc.) to select images, etc., the architecture may employ one or more knowledge-based systems such as an expert system. In general, such expert systems are designed by solving relatively complex problems by using reasoning techniques that may employ conditional statements (e.g., if-then rules). In some arrangements such expert systems may use multiple systems such as a two sub-system design, in which one system component stores structured and/or unstructured information (e.g., a knowledge base) and a second system component applies rules, etc. to the stored information (e.g., an inference engine) to determine results of interest (e.g., select images likely to be presented).

Figure 4:
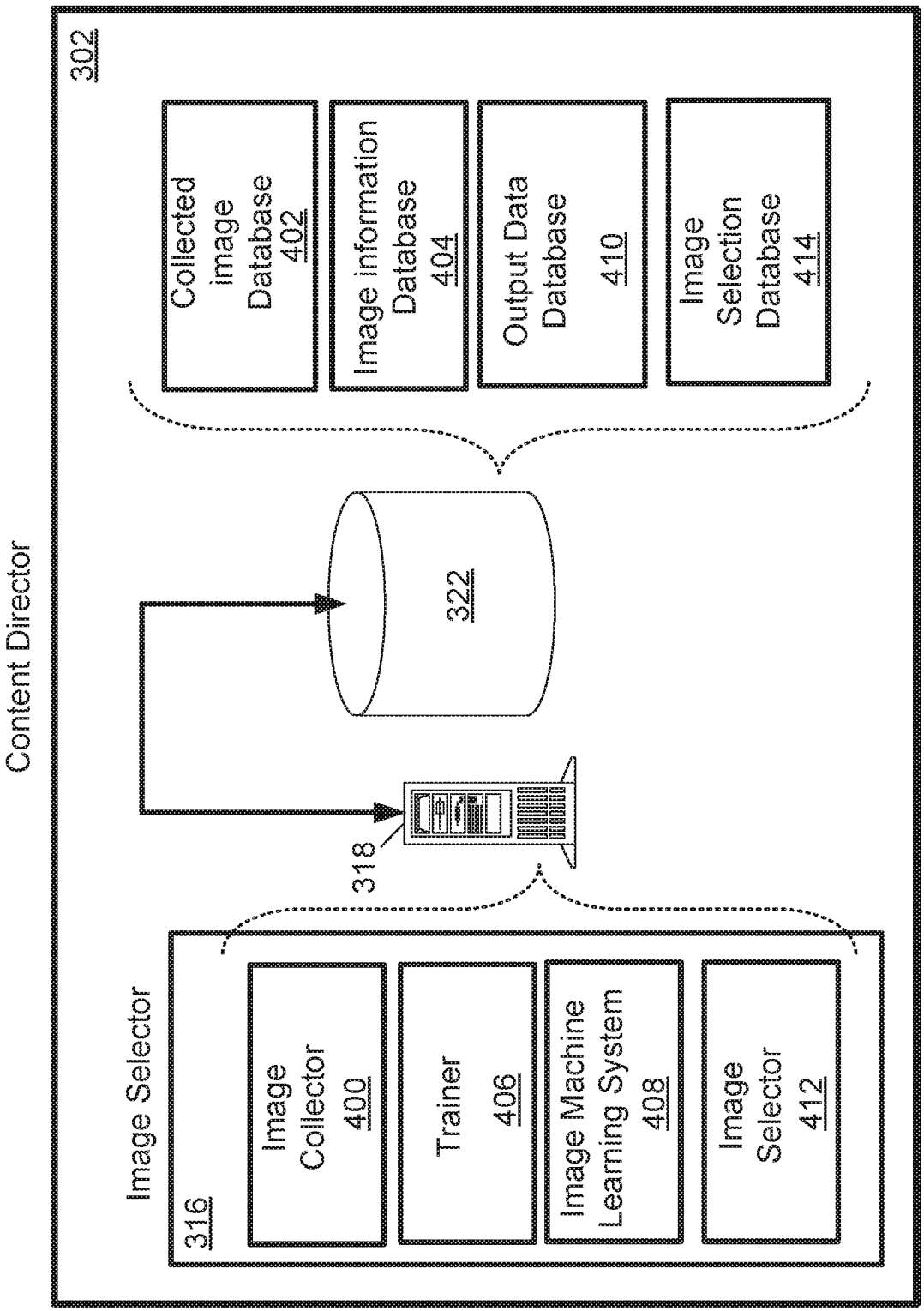
FIG. 4 is a block diagram of the content director shown in FIG. 3.

Referring to FIG. 4, the image selector 316 (which is executed by the computer system 318, e.g., a server, located at the content director 302), is illustrated as containing a number of modules. In this arrangement, the image selector 316 includes an image collector 400 that is capable of receiving data that represents a variety of images. For example, images can be provided in one or more formats (e.g., .jpeg, .pdf, etc.) that provide a visual element representation (e.g., a pixel representation) of a corresponding image. In some cases, additional information can be provided with the imagery; for example, one or more attributes that reflect aspects of an image. Attributes can represent visual aspects of imagery (e.g., resolution, colors, etc.), content aspects (e.g., objects present in an image, text present in an image), information associated with images (e.g., previously published by a brand, not selected for publication by a brand, etc.), etc. Such attributes can be represented in various forms; for example, each attribute may be represented by one or more numerical values (e.g., Boolean values, fix point values, floating point values, etc.) and all of the attributes may be provided in single form (e.g., a vector of numerical values) to the image collector 400. Other types of data may also be collected for training a machine learning system; for example, guidelines from one or more entities (e.g., a brand owner, a brand marketer, etc.) can be provided to assist with image selection. For example, a brand owner can require certain content be included or be absent from images that would be used to present their products, services, etc. Such requirements can be provided in as guidelines in the form of logic values (e.g., a logic value indicating that text be absent from images, a logic value indicating that collage images can be selected for presentation, etc.). Performance data associated with images can also be provided to assist with training a machine learning system; for example, data representing user interactions (e.g., data representing user-directed pointer selections or "clicks", data representing user-directed hovering of a pointer over an image, etc.), data representing transactions (e.g., user initiated purchases of a product or service represented in an image), etc.

In this arrangement, such image data may be previously stored (e.g., images stored in a collected image database 402) and retrieved from the storage device 322. In some arrangements, information associated with images (e.g., image attributes, guidelines, performance data, etc.) may be provided and stored in an image information database 404. Retrieving the image data (stored in database 402) and/or image information (stored in the database 404), a trainer 406 is provided the data to train an image machine learning system 408. Various type of data may be used for training the system; for example, images (e.g., thousands of images) and guidelines (for one or more brand owners) can be used by the trainer 406. In another arrangement, guidelines may not be employed and images along with other information may be used. For example, data representing whether a particular brand approved an image can be used with the image data (by the trainer 406). By not using guidelines, a machine learning system 408 may be trained to select images for a brand (e.g., brand owner, brand marketer, etc.) without the brand providing a list of their requirements. From the training process, the machine learning system determines which images the brand (or brands) would likely approve or disapprove. To assist the training, additional information (stored in the database 404) can be used; for example, data that indicates whether a corresponding image (stored in the database 402) was previously published by a brand rejected for publication by the brand. As such, an attribute of the image can represent if the image has been published by an entity or not.

Once trained, the image machine learning system 408 may be provided input data such as a series of images to determine which images would likely be selected for presentation by a particular brand. For example, after being trained for a particular brand (e.g., from images and guidelines), the image machine learning system 408 can be provided an input image to determine similarity between the image and the guidelines of the brand. The system 408 may output data that indicates which guidelines are satisfied by the input image. For example, a logic value can be output for each guideline (associated with the brand) that indicates if the guideline is satisfied (or not). Along with storing this output data (e.g., the determined logic values for an image) in the storage device 322 (e.g., in an output data database 410), the output data can be further processed. For example, output data (e.g., logic values for each guideline) for the input image can be provided to an image analyzer 412 to analyze and determine if the input image should be selected for the brand. If the image satisfies the brand guidelines (e.g., the logic values track the guidelines), the image analyzer 412 flags the image for presenting to the brand as an image that appropriately presents the products, services, etc. of the brand. If the guidelines are not satisfied, the image selector 412 flags the image as not selected for presenting to the brand (e.g., does not appropriately represent the brand). The results determined by the image analyzer 412 can be stored on the storage device 322 (e.g., in an image selection database 414) for later retrieval and use. For example, images deemed appropriate, deemed inappropriate, etc. are usable to further train the image machine learning system 408. In one arrangement the images can be used to further train a machine learning system associated with the brand; however, the image could also be employed to train a machine learning system being trained to select images for one or more other brands.

Figure 5:
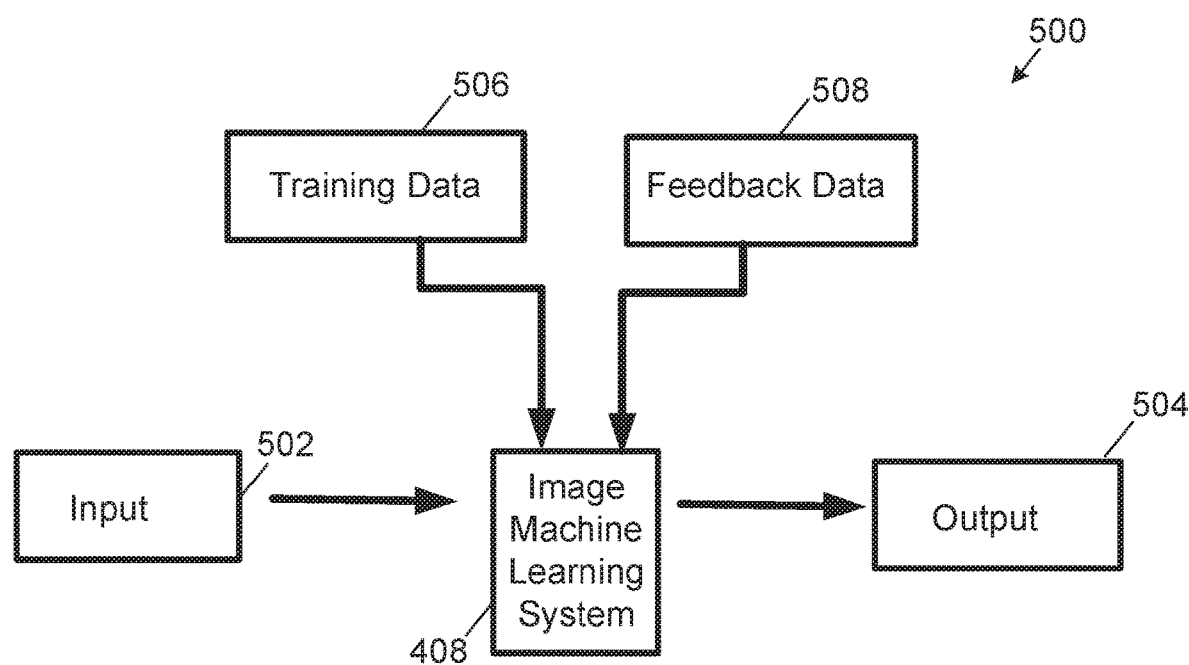
FIG. 5 is a block diagram of an image machine learning system being trained.

Referring to FIG. 5, a block diagram 500 is presented that provides a graphical representation of the functionality of the image machine learning system 408 (shown in FIG. 4). Prior to using the learning system 408 to process an input 502 (e.g., a series of images, each represented as a collection of visual elements) to produce an output 504 (e.g., a representation of the brand's guidelines being satisfied for the image, a performance prediction for the image), the learning system needs to be trained. Various types of training data 506 may be used to prepare the image machine learning system 408 to identify imagery that a brand (e.g., a brand marketer, brand owner, etc.) might potentially use to present brand products, services, etc. to end users (e.g., potential purchasers). For example, guidelines associated with a brand (e.g., twenty individual guidelines being represented by a Boolean value) and corresponding images can be used to train the machine learning system 408. Different types of images are typically used for training the system; for example, images in which each of the guidelines are satisfied are used. Images with one guideline being satisfied, or, two or more guidelines being satisfied may be used. Additionally, images in which all the brand guidelines are not satisfied can also be used to improve training (by showing contrast). In some instances, images may be used multiple times for system training; for example, an image may be indicating as satisfying one set of guidelines. Then the same image may indicated as satisfying another set of guidelines (which may or may not contain guidelines identified during the initial use of the image). As such, images with various attributes can be used for training, including indicating that an image may have adjustable attributes. In some instances, training imagery may be modified prior to use; for example, image geometry may be adjusted (e.g., producing a mirror image, blurring an image, injecting noise in an image). Image content may also be adjusted (e.g., adjusting colors of an image, adjusting saturation levels, etc.) to increase training robustness. As such, a training image can be used to represent multiple guidelines. In some instances, images may be created for the system training; for example, collages that include multiple images may be created for training the system.

Data representing end user interactions may also be employed as training data 506; for example, websites associated with the brand (e.g., websites presenting the brand products, services, etc.) can be monitored for user interaction with imagery being presented. Such interactions may include pointing device (e.g., mouse, track pad, etc.) interactions with a site (e.g., clicking on an image, selecting product webpages for review, etc.) that can be tracked and data representing these interactions can be considered training data 506 used to prepare the image machine learning system 408. Other types of interaction data may also be employed; for example, websites can be monitored for transactions associated with presented images (e.g., of brand items). In one arrangement tracking software (e.g., pixel tracking software, software agents, etc.) can monitor purchases involving brand products and send notifications (e.g., to the brand marketer 304, the content director 302, etc.) that include details about such transactions. Alerted to which types of imagery, brand products, etc. are resonating with end users (e.g., being interacted with, initiating purchases, etc.), this interaction data can also be used as training data 506.

Imagery may also be provided from various sources; for example, social networks (e.g., Facebook, Twitter, Instagram, etc.) often present imagery (e.g., in posts, messages, etc.) associated with a brand (e.g., a brand's products, services, etc.). By monitoring such networks (e.g., using software agents, etc.), images may be collected and potentially used as training data 506. Additionally, such imagery can be collected for use as input 502 to the image machine learning system 408, once the system has been initially trained. Such imagery may be professionally prepared; however, imagery created by end users (e.g., product users) can be more visually inviting and may attract more interactions from potential purchasers than other types of imagery (e.g., professionally prepared product images).

Once initially trained, input 502 may be provided to the image machine learning system 408 to generate output 504. For example, a series of images may be collected, created, etc. and input for identifying particular images (in the series) that may be of interest to a brand (e.g., brand marketer) based upon the data used to train the learning system (e.g., images, brand guidelines, performance data with end users). As such, the image machine learning system 408 can predict images that should perform well with end users. Additionally, the predicted images can be used to further train the machine learning system and improve predictive accuracy, for example, based on this more contemporary data that reflects desired performance with end users. As illustrated in the figure, feedback data 508 can be provided to the image machine learning system 408 to further the training. Recently used images that have performed well can be represented (e.g., in attributes) and provided to the image machine learning system 408. Interaction data such as data that represents user interacting with recently presented images (e.g., click data indicating users selecting images, data indicating users have hovered a pointing device on the image, etc.), data that represents users executing transactions based upon recently presented images (e.g., initiating the purchase of a brand product, service, etc.), etc. Along with providing the feedback data 508 to the image machine learning system 408 to improve accuracy, the feedback data can be stored (e.g., at the storage device of the content director 302) for later retrieval and further processing (e.g., training other machine learning systems, attribute adjustments, etc.).

To implement the image machine learning system 408, one or more machine learning techniques may be employed. For example, supervised learning techniques may be implemented in which training is based on a desired output that is known for an input. Supervised learning can be considered an attempt to map inputs to outputs and then estimate outputs for previously unseen inputs (a newly introduced input). Unsupervised learning techniques may also be employed in which training is provided from known inputs but unknown outputs. Reinforcement learning techniques may also be used in which the system can be considered as learning from consequences of actions taken (e.g., inputs values are known and feedback provides a performance measure). In some arrangements, the implemented technique may employ two or more of these methodologies.

In some arrangements, neural network techniques may be implemented using the data representing the images (e.g., a matrix of numerical values that represent visual elements such as pixels of an image, a vector of numerical values to represent brand guidelines, etc.) to invoke training algorithms for automatically learning the images and related information. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to training data. By using the image data (e.g., attribute vectors), a function may be defined that quantifies error (e.g., a squared error function used in regression techniques). By minimizing error, a neural network may be developed that is capable of determining attributes for an input image. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., image attributes). As such, multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer. In one arrangement, the image machine learning system 408 uses a fifty—layer deep neutral network architecture (e.g., a ResNet50 architecture).

One type of machine learning referred to as deep learning may be utilized in which a set of algorithms attempt to model high-level abstractions in data by using model architectures, with complex structures or otherwise, composed of multiple non-linear transformations. Such deep learning techniques can be considered as being based on learning representations of data. In general, deep learning techniques can be considered as using a cascade of many layers of nonlinear processing units for feature extraction and transformation. The next layer uses the output from the previous layer as input. The algorithms may be supervised, unsupervised, combinations of supervised and unsupervised, etc. The techniques are based on the learning of multiple levels of features or representations of the data (e.g., image attributes). As such, multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Figure 6:
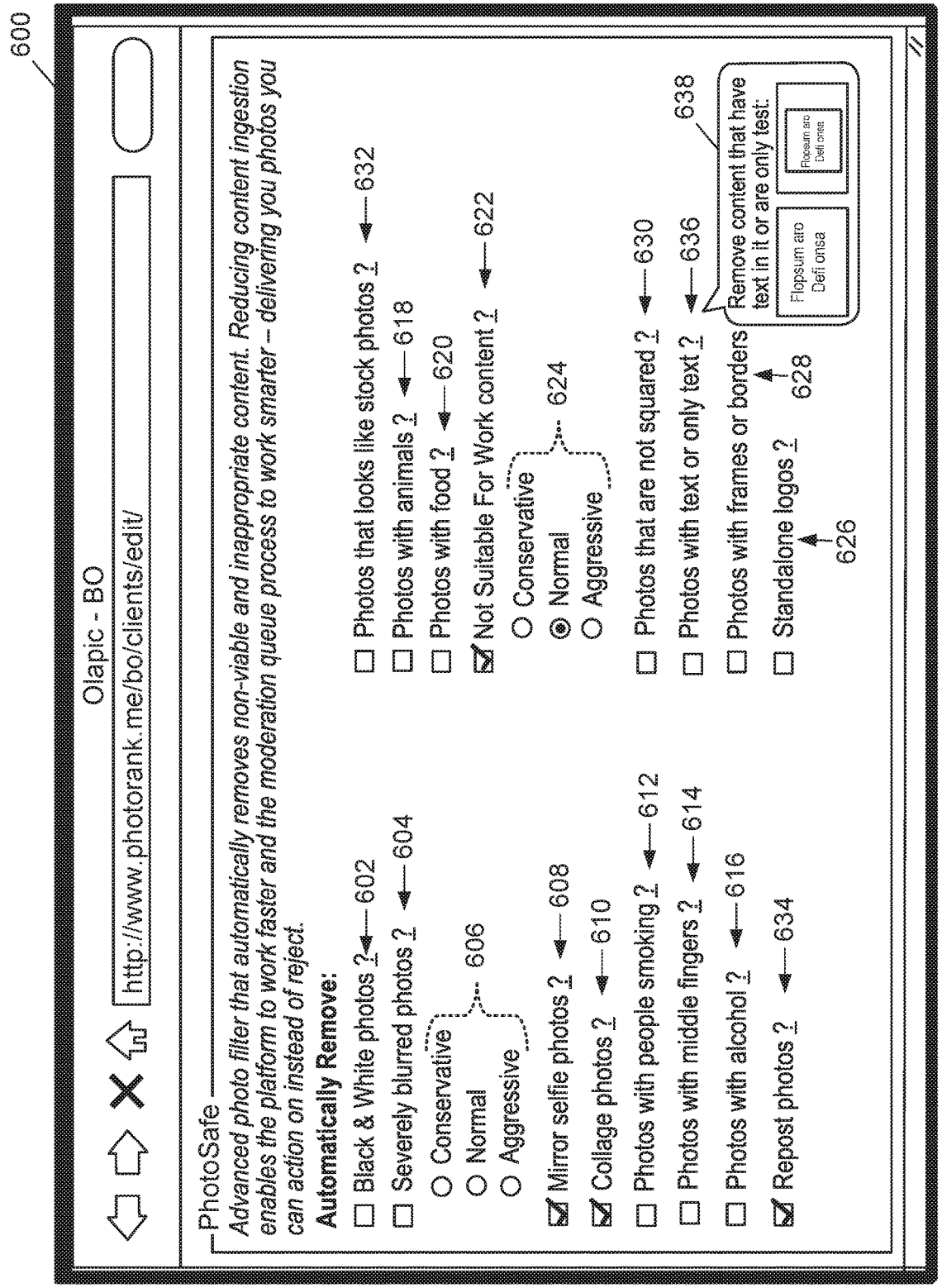
FIG. 6 is a webpage presenting a list of selectable image attributes.

Referring to FIG. 6, various types of techniques may be employed to collect information such as guidelines from an entity such as a brand (e.g., a brand owner, brand marketer, etc.). For example, one or more electronic documents (e.g., webpages) may be provided to a representative or representatives of the brand to collect information that represents desired imagery. In this example, a collection of selectable attributes is presented on a webpage that provides the different types of guidelines that can be selected for filtering imagery. In this example, each attribute of desirable imagery can be selected by a user interacting with a corresponding graphical check box. In general, some of the attributes represent graphical aspects of the imagery of interest. By selecting a check box (and have a graphical check appear), the user can filter out, for example, any image that includes the graphical aspect of the attribute. Alternatively, the user can also decide not select a check box (and no graphical check appear). In that case, the corresponding attribute would not be used to filter out images for the brand. For example, by selecting attribute 602 each black and white image would be removed and not selected from potentially being presented to the brand (e.g., for publishing a product, service, etc. of the brand). Other colors, patterns, etc. can be used. By analyzing the content of an image (e.g., the pixels of an image), the image selector 316 can determine if black and white imagery is present and if the image should be filtered out. For some graphical attributes machine learning techniques can be employed to identify presence (or absence) of the attribute. Image processing and/or other techniques may be employed rather than machine learning techniques for identifying the presence or the absence of graphical attributes. Attribute 604 allows blurry images to be filtered out (or included) in the imagery that may be used by brand. In this instance, the attribute allows for different levels of blurriness to be selected as indicated by the set of radio buttons 606. By selecting one of the buttons, a level of blurriness is set (e.g., a weighting factor) to determine if the image is to be considered blurry or not. Attribute 608 allows for mirror imagery to be filtered out or retained. By analyzing the pixels and content of an image, the image selector 316 can determine if mirror imagery is present. Attribute 610 allows for images that contain collages (or other combinations of content) to be filtered out or retained. The image selector 316 may analyze the content of an image for containing combinations of images, etc. to determine if a collage is present.

Similar to graphical attributes, other types of attributes may be used filter out imagery. For example, content of the images may be used as an attribute to determine if images should be filtered out as a brand guideline. To perform filter operations based on content the image selector 316 may be trained to recognize the content (e.g., from training images) and take appropriate actions (e.g., delete the images). For example, attribute 612 allows for images containing representations of individuals performing certain acts (e.g., smoking) to be filtered out or retained. Individuals performing bad behavior can also be detected though the training process of machine learning and filtered out, as represented by attribute 614. Through the training of the machine learning system, particular objects can be recognized and serve as the basis for filtering an image. For example, images found to be containing alcohol (e.g., beer bottle, glasses of alcoholic beverages, etc.) may be detected and removed, as indicated by attribute 616. Similarly, images containing animals (represented by attribute 618), images containing food (represented by attribute 620), etc. may be content that is subject to being filtering out. Generalized content can be selected for filter control; for example, an attribute 622 can be selected to filter out images that contain content not suitable for the workplace. Such content may include numerous example, such as activities by employees, inappropriate images for work, etc. Weighting, subsetting, etc. may be employed to widen or narrow the filtering operation for this attribute. In this example, a suitability level may be selected for the attribute 622 by having the user select from a collection of radio buttons 624 (e.g., that applies weighting to the attribute). Business aspects can also serve as a filtering basis, for example, the presence of one or more trademarks, tradenames, logos, etc. may control filter operations as provided by attribute 626.

Graphical attributes may also reflect other aspects of imagery. For example, as represented by attribute 628, images having frames, boarders, etc. can serve as a basis for filtering or retaining images. Shaping of the images, such as if an image is square—shaped as represented by attribute 630 can control filter operations. If an image appears as a stock photo (e.g., recognized by training the system on stock imagery) as represented by attribute 632, images that contain repost images (recognized through training the system with older images) as represented by attribute 634, etc. can control filtering operations of the image selector 316. The presence of text in an image can also control filtering (as demonstrated in FIG. 2). As represented by attribute 636, images containing text may be filtered by training the machine learning system to recognize variants of text (e.g., different fonts, languages, etc.). As provided in this particular example, additional information may be provided to a user that has shown interest in an attribute. In this case, a graphic 638 is presented to the user upon interacting with the attribute (e.g., hovering the point device over the attribute). Here graphical representations of filtered out samples are presented to the user to assist with determining if the attributed should be activated or not by the image selector to filter images for the brand. The webpage 600 presents one example collection of attributes (e.g., graphical and content attributes); however, other types of attributes may also be presented for selection to train a machine learning system.

Figure 7A:
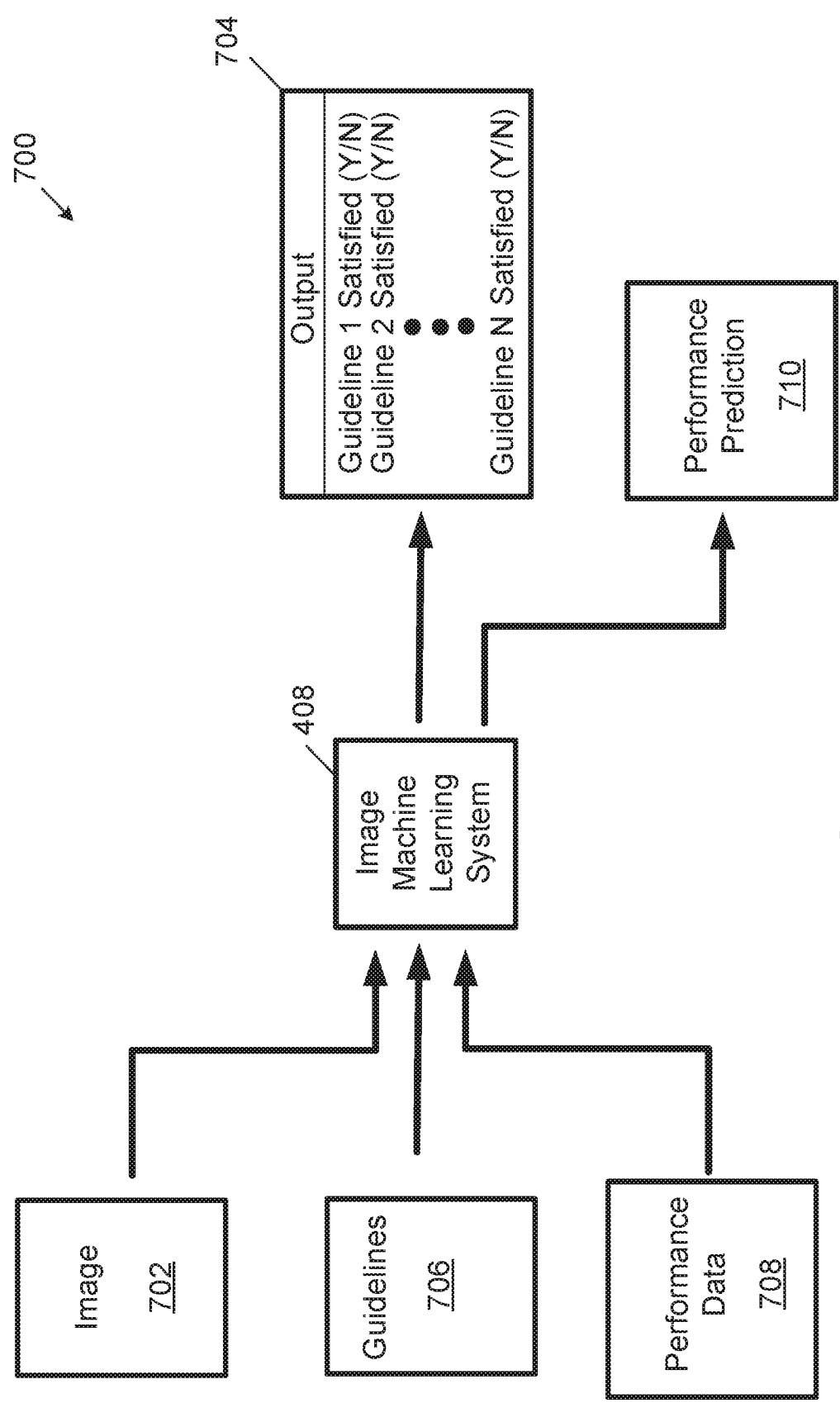
FIGS. 7(A) and (B) are block diagrams of a trained image machine learning system that selects images.
Figure 7B:
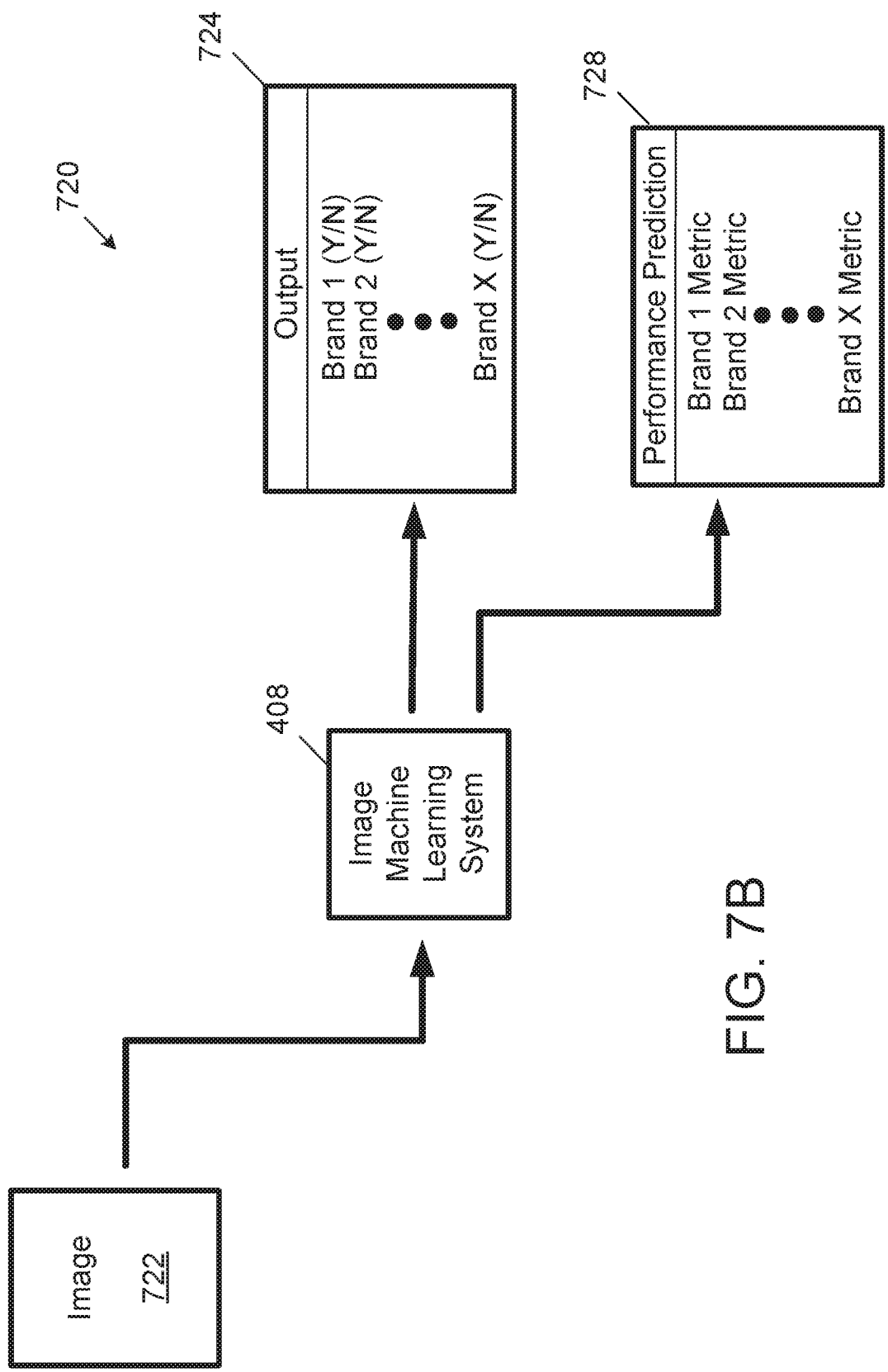

Referring to FIGS. 7A and 7B, data flow diagrams graphically represent operation of the image machine learning system 408 after being initially trained. As mentioned training data can be employed from a number of sources; for example, a considerable number of training images, guidelines from brands (e.g., such as data collected from a webpage such as the webpage 600 shown in FIG. 6), interaction data (e.g., click data, etc. representing user interactions with images), etc. Once trained, images can be provided to the image machine learning system 408 for potential selection for a brand (e.g., to use in presenting products, services, etc. of the brand). FIG. 7A presents a block diagram 700 that graphically represents an image 702 being input into the machine learning system 408 and to produce an output 704 that represents how the image reflects upon a set of brand guidelines 706, which are also input into the system. In some arrangements, additional information may also be entered into the machine learning system 408 for producing one or more additional outputs. For example, performance data 708 associated with the guidelines 706 may be input to allow the image machine learning system 408 to determine a performance prediction for the input image 702. In one arrangement, the input performance data 708 can represent how images that satisfy one or more of the guidelines perform when presented to end users. For example, images that are absent text but include a collage may perform well for the brand while other images containing other combination of attributes may not perform as well. Being provided this performance data, the machine learning system 408 can calculate a performance metric as a performance prediction 710 for the input image 702 that represents a likelihood of catching the attention of users and potentially initiating interactions (e.g., initiating transactions). The output 704 can employ one or more forms, formats, etc. to assist with determining if the input image 702 should be selected for providing to the brand (associated with the guidelines 706) for possible publication (e.g., to advertise a brand product). In this example, the output 704 includes a vector of data (e.g., a vector of Boolean values) that represent if the input image 702 satisfies each of the guidelines 706 (for the brand). Rather than Boolean values (e.g. logic values of "0" or "1"), values from a range of values may be output for each guideline. For example, a value that represents a confidence level may be output for each of the guidelines (e.g., ranging from a level of 0.0 to 1.0). As illustrated, the output 704 includes a vector of N elements that respectively represent each of the N individual guidelines included in the guidelines 706. Provided this output 704 and potentially the performance prediction 710, the content director 302 (shown in FIG. 3) can determine if the input image 702 might be accepted by the brand (e.g., the brand marketer 304). Further processing may allow for other types of outputs; for example, after processing a number of images, ranking operations may be executed by the image selector 316 to create a ranked list of images as provided by the machine learning system (or a separate machine learning system).

Referring to FIG. 7B, the amount of input provided to the image machine learning system 408 can be reduced, for example, to reduce the amount of information needed from the entity (e.g., a brand owner, brand marketer, etc.). In this illustrated example, guidelines are not collected from an entity to train the image machine learning system 408. Rather, a significant number of images (e.g., tens of thousands, hundreds of thousands, etc.) that may be associated with a number of entities (e.g., brands) are used to train the system 408. In one arrangement, images previously used by a brand are used to train the system 408 such that the attributes are internally developed by the system that reflect what types of imagery the brand considers appropriate. Other types of imagery may also be used to for system training; for example, images that have been rejected by the brand or not published by the brand may be used to train the system 408 so that attributes considered inappropriate by the brand further train the system. Along with imagery, other types of data may be used for such training; for example, performance data (e.g., click data, etc.) associated with particular images (e.g., images published by a brand) to allow for performance predicting of other images. By using a vast amount of imagery to train the system 408, guidelines, attributes, etc. can be internally developed by the system 408 for multiple entities (e.g., brands). For example, the system 408 can learn the preferences for multiple footwear brands based upon vast amounts of training imagery that was used (or not used) to publish the footwear products of these brands. Further, such training can be completed prior to a brand or brands becoming aware of the capabilities of the content director 302. Without needing to provide extensive guidelines about appropriate and inappropriate attributes, a brand may become interested engaging the content director 302 to identify imagery that the brand can select for publications about their products, services, etc. (without having to determine and provide the content director 302 with any guidelines).

As illustrated in the figure, a data flow diagram 720 represents an input image 722 being provided to the image machine learning system 408, which has been trained by a vast collection of imagery to internally develop guidelines for one or a number of brands. Along with the imagery, the system 408 has also been trained with performance data. For example, data representing brand use of each training image (e.g., identify each brand that published the image, etc.) is provided during training of the system. Through the layers of the machine learning system 408 (e.g., a fifty—layer deep neural network architecture—ResNet50), relationships between attributes and brands are developed (e.g., a brand tends to publish imagery with particular attributes). In one example, the system 408 is trained using vast collection of images that have been published by brands and images that have been rejected by brands. Along with data indicating which brand published a corresponding image, additional information may be used for training the system. For example, performance data (e.g., click data, transaction data, etc.) may be provided for training the system. Being trained with such performance data also allows the system 408 to develop knowledge about which attributes are associated with better performing images, and thereby allow performance to be predicted for new images (to be input into the system 408). In some arrangements, training may include providing the system 408, for each brand, an equal number of images that are positively associated with the brand (e.g., were published by the brand) and images that are negatively associated with the brand (e.g., were rejected for publication by the brand). In some training instances, some training images may be used for two or more brands (e.g., an image has been published by two brands). In such situations, the training image may be entered multiple times into the system (e.g., once for the first brand to use the image, and a second time for the second brand that used the image). Such training images may also just be entered once into the system 408 with data identifying each brand that has used the image.

As illustrated in the figure, the input image 722 is provided to the trained image machine learning system 408 and an output 724 is produced that represents if the input image is appropriate for one or more of the brands associated with the training of the system. In this particular example, the output 724 includes a vector of Boolean values that represent if the image 722 is appropriate (or not) for X number of brands (e.g., true for being appropriate, false for not being appropriate). Other types of output data may also be provided by the machine learning system 408; for example, performance predictions can be provided for each of brands associated with training the system (e.g., brand performance data was provided during training of the system). In this example, an output 728 provides a data vector in which each vector element represents a performance metric for a corresponding one of the X brands. Elements could be numerical values that represent performance (e.g., larger values indicate higher probability of success and lower values predict lesser performance for the respective brand).

Each data flow diagram 700 and 720 illustrates a technique to determine if an image should be selected for providing to a brand (for possible publication). Additionally, a prediction of the image's performance may be attained through the operations associated with either of the data flow diagrams 700 and 720. Along with implementing either of the block diagrams 700 or 720 in an isolated manner, the functionality provided by the diagrams can be combined. For example, an implementation may use the functionality of block diagram 700 to identify images that satisfy the publication guidelines of one or more brands. Once identified, the images can be used to train an implementation that employs the functionality of block diagram 720. Trained on images associated with different brands, the implementation can learn similarities or differences with other newly introduced brands and identify images for publication along with predicting performance.

In another arrangement, the functionality of the block diagrams 700 and 702 can assist in creating default attributes from one or more brands. For example, providing a large collection of images (e.g., tens of thousands of images) to the image machine learning system 408, along with data indicating if each of the images was used (e.g., selected for publication) by a brand or not, the system can develop attributes associated with a brand from the images. Graphic based attributes (e.g., selected images include black & white imagery, selected images include blurred imagery, etc.), content based attributes (e.g., selected images containing food, unselected images containing animals, etc.), etc. can be identified by the machine learning system 408. Once the attributes are developed for a particular brand, the attributes can be presented for inspection, adjustment, etc. by the brand. For example, a webpage similar to the webpage 600 (shown in FIG. 6 and used to receive attribute selections) and be used to present default brand attributes as determined from images that were previously selected by the brand for publication or not selected. A brand (e.g., brand marketer) could then be presented these attributes as defaults and allowed to adjust the default attributes, for example, for identifying more images for the brand.

In some arrangements, parameters may be adjusted in the implementations for assisting with various operations. For example, parameters of the machine learning system 408 shown in block diagram 700 may be adjusted to allow more images to be considered as satisfying guidelines (e.g., the acceptance tolerance may be widened for satisfying a guideline). As such, more imagery would be considered as acceptable by a particular brand. With the additional imagery, more content could be provided to an implementation of block diagram 720 to widen the training range for one or more brands. Other techniques may also be employed, for example, weighing may be applied to guidelines (provided in the block diagram 700) to reduce or enhance the effect of particular attributes. Such weighting can reduce or increase the number of images identified from an implementation of block diagram 700. If these images are used to train an implementation of block diagram 720, the number of training images correspondingly increases or decreases. The imagery used by the block diagrams may be individual images, multi-frame imagery, etc. For example, a single frame image be used for training a machine learning system (e.g., the image machine learning system 408) for eventually selecting individual images for a brand. Similarly, multi-frame images (e.g., video may in use to train a machine learning system (a video machine learning system) for selecting video for a brand.

Figure 8:
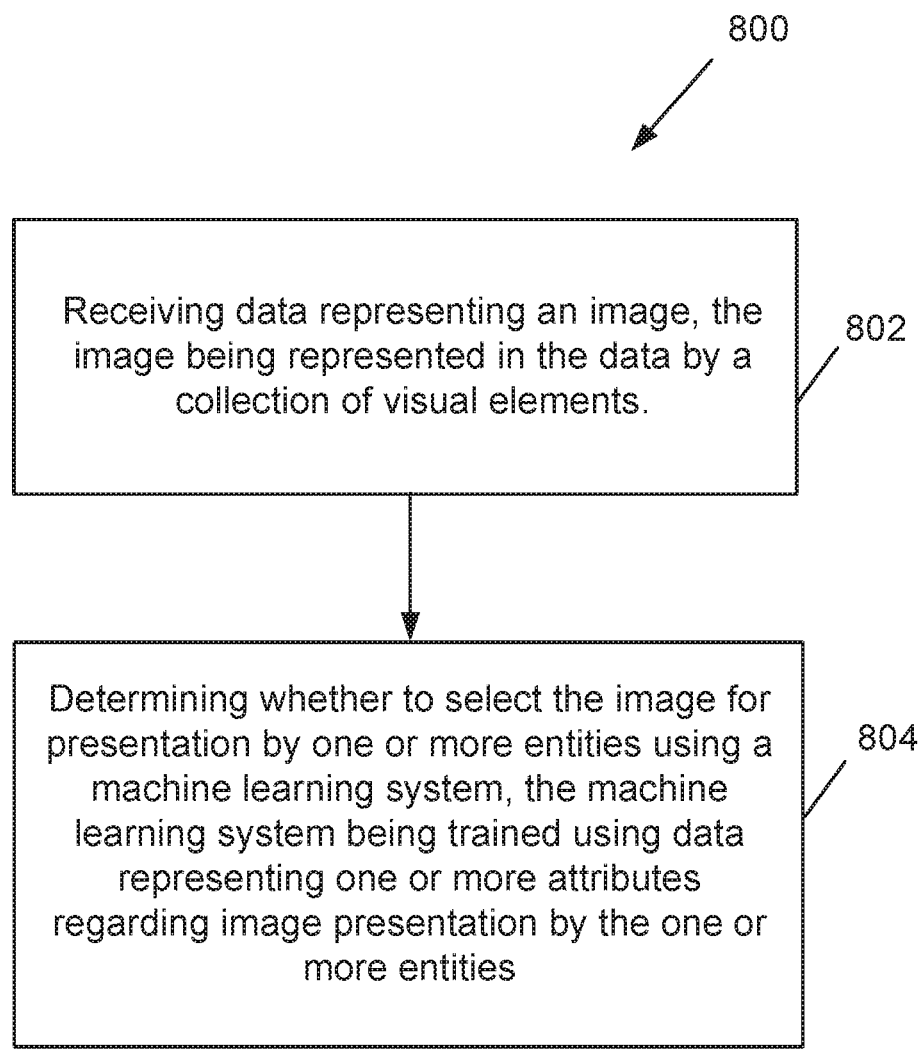
FIG. 8 is a flowchart of operations of an image selector.

Referring to FIG. 8, a flowchart 800 represents operations of an image selector (e.g., the image selector 316 shown in FIG. 3 and FIG. 4) being executed by a computing device (e.g., the server 318 located at the content director 302). Operations of the image selector are typically executed by a single computing device (e.g., the server 318); however, operations may be executed by multiple computing devices. Along with being executed at a single site (e.g., the content director 302), the execution of operations may be distributed among two or more locations. For example, a portion of the operations may be executed at a location external to the content director (e.g., the brand marketer site 304), one or more at an end user devices (e.g., the computing device 306), etc.

Operations of the image selector 316 may include receiving 802 data representing an image. The image is represented in the data by a collection of visual elements. For example, an image may be received that is represented by a two-dimensional matrix of numerical values and each value represents a visual property (e.g., color) that can be assigned to a pixel of a display. Various file formats (e.g., ".jpeg", ".pdf", etc.) may be employed to receive the image data. Operations of the image selector 316 may also include determining 804 whether to select the image for presentation by one or more entities using a machine learning system. The machine learning system is trained using data representing a plurality of training images and data representing one or more attributes regarding image presentation by the one or more entities. For example, a collection of images and data representing if the images have been presented by particular entities (e.g., brands) may be used for training a machine learning system such as the image machine learning system 408. In another arrangement, images and guidelines (collected from a brand owner, brand marketer, etc.) may be used to train the machine learning system. Trained with such data, the machine learning system can efficiently determine if another image is likely to be selected by the same entity (e.g., brand owner, brand marketer, etc.). Further, based on the training, the system can determine if the image is likely to perform well for the entity (e.g., attract views and possible user interactions).

Figure 9:
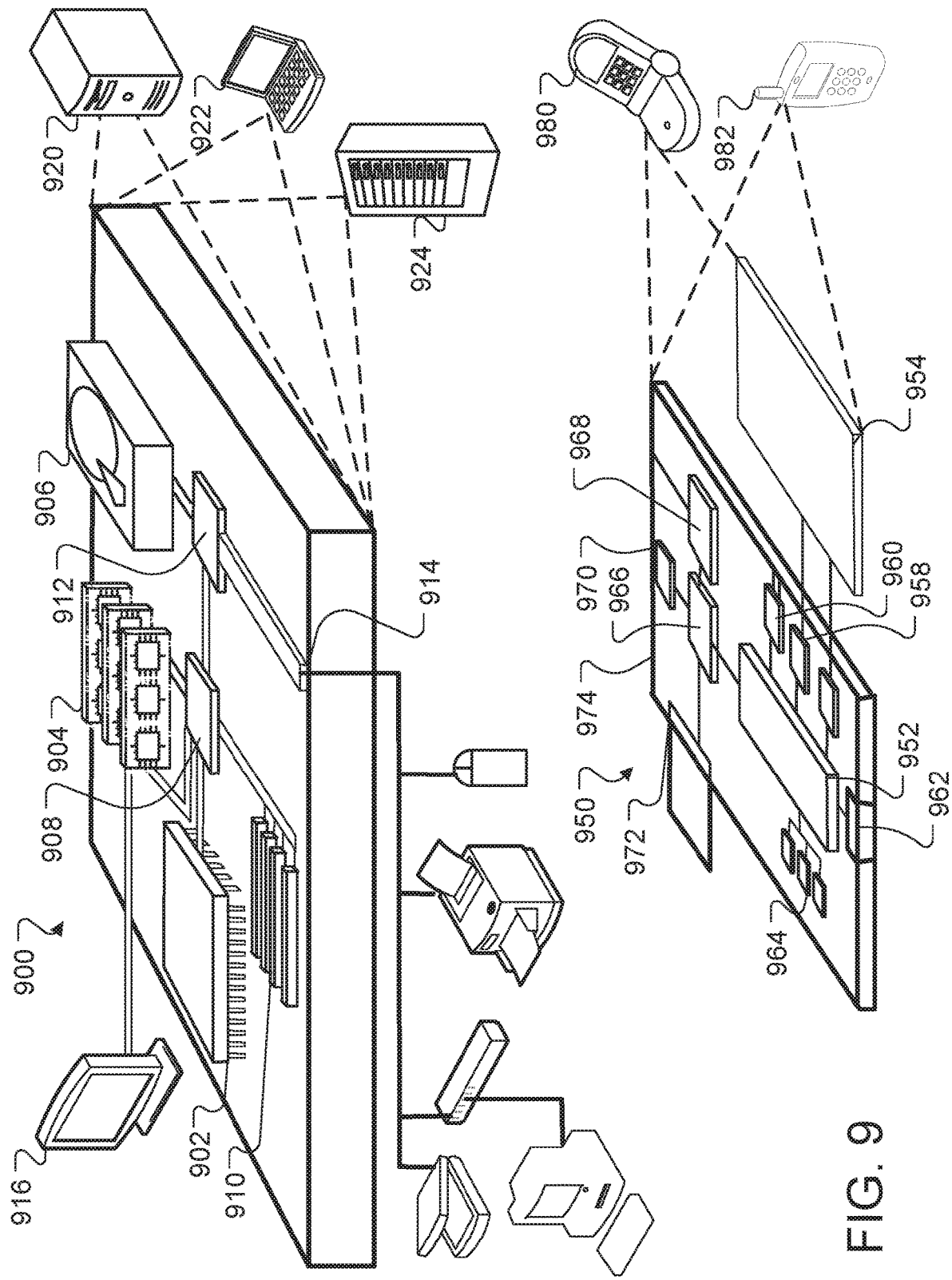
FIG. 9 illustrates an example of a computing device and a mobile computing device that can be used to implement the techniques described here.

FIG. 9 shows an example of example computing device 900 and example mobile computing device 950, which can be used to implement the techniques described herein. For example, a portion or all of the operations of image selector 316 (shown in FIG. 3) may be executed by the computing device 900 and/or the mobile computing device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, including, e.g., display 916 coupled to high speed interface 908. In other implementations, multiple processors and/or multiple busses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium (e.g., a magnetic or optical disk. Memory 904 may be non-transitory.)

Storage device 906 is capable of providing mass storage for computing device 900. In one implementation, storage device 906 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 904, storage device 906, memory on processor 902, and the like.)

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer (e.g., laptop computer 922.) In some examples, components from computing device 900 can be combined with other components in a mobile device (not shown), e.g., device 950. Each of such devices can contain one or more of computing device 900, 950, and an entire system can be made up of multiple computing devices 900, 950 communicating with each other.

Computing device 950 includes processor 952, memory 964, an input/output device (e.g., display 954, communication interface 966, and transceiver 968) among other components. Device 950 also can be provided with a storage device, (e.g., a microdrive or other device) to provide additional storage. Each of components 950, 952, 964, 954, 966, and 968, are interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for coordination of the other components of device 950, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations, and multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 950 through expansion interface 972, which can include, for example, a SIMM (Single In Line Memory Module) card interface. Such expansion memory 974 can provide extra storage space for device 950, or also can store applications or other data for device 950. Specifically, expansion memory 974 can include instructions to carry out or supplement the processes described above, and can include secure data also. Thus, for example, expansion memory 974 can be provided as a security module for device 950, and can be programmed with instructions that permit secure use of device 950. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 964, expansion memory 974, and/or memory on processor 952), which can be received, for example, over transceiver 968 or external interface 962.

Device 850 can communicate wirelessly through communication interface 966, which can include digital signal processing circuitry where necessary. Communication interface 966 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 968. In addition, short-range communication can occur, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950. Sensors and modules such as cameras, microphones, compasses, accelerators (for orientation sensing), etc. may be included in the device.

Device 950 also can communicate audibly using audio codec 960, which can receive spoken data from a user and convert it to usable digital data. Audio codec 960 can likewise generate audible sound for a user, (e.g., through a speaker in a handset of device 950.) Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device implemented method comprising:
receiving data representing an image, the image being represented in the data by a collection of visual elements; and
determining whether to select the image for presentation by one or more entities using a machine learning system, the machine learning system being trained using at least one of data representing a plurality of training images and data representing one or more attributes regarding image presentation by the one or more entities, wherein the at least one of the plurality of training images is selectable for inclusion or exclusion by the one or more entities to present the selected image for training the machine learning system.

2. The computing device implemented method of claim 1, wherein the one or more attributes represent whether each of the training images was presented by one or more of the entities.

3. The computing device implemented method of claim 1, wherein the one or more attributes represent one or more graphical attributes and one or more content attributes.

4. The computing device implemented method of claim 3, wherein the one or more attributes are entered into a webpage by the one or more entities.

5. The computing device implemented method of claim 3, wherein the graphical attributes represent one or more colors included in a corresponding image of the plurality of training images.

6. The computing device implemented method of claim 3, wherein the content attributes represent whether textual content is present.

7. The computing device implemented method of claim 3, wherein the content attributes represent whether a particular item is present.

8. The computing device implemented method of claim 1, wherein the machine learning system provides data representing whether the one or more attributes of the image is selectable for presentation by each of the one or more entities.

9. The computing device implemented method of claim 1, wherein at least one of the training images includes two or more of the attributes.

10. The computing device implemented method of claim 1, wherein at least one of the training images is absent all of the one or more attributes.

11. The computing device implemented method of claim 1, wherein one of the training images represents one attribute and another training image represents another attribute.

12. The computing device implemented method of claim 1, wherein a portion of the training images have been previously rejected.

13. The computing device implemented method of claim 1, wherein a portion of the training images have been previously published.

14. The computing device implemented method of claim 1, wherein the machine learning system is also trained on performance data.

15. The computing device implemented method of claim 1, wherein the machine learning system provides data representing the predicted performance of the image.

16. The computing device implemented method of claim 1, further comprising: further training of the machine learning system using data associated with another image selected for publication.

17. A system comprising:
a computing device comprising:
a memory configured to store instructions; and
a processor to execute the instructions to perform operations comprising:
receiving data representing an image, the image being represented in the data by a collection of visual elements; and
determining whether to select the image for presentation by one or more entities using a machine learning system, the machine learning system being trained using at least one of data representing a plurality of training images and data representing one or more attributes regarding image presentation by the one or more entities, wherein the at least one of the plurality of training images is selectable for inclusion or exclusion by the one or more entities to present the selected image for training the machine learning system.

18. The system of claim 17, operations further comprising:
further training of the machine learning system using data associated with another image selected for publication.

19. One or more non-transitory computer readable media storing instructions that are executable by a processing device, and upon such execution cause the processing device to perform operations comprising:
receiving data representing an image, the image being represented in the data by a collection of visual elements; and
determining whether to select the image for presentation by one or more entities using a machine learning system, the machine learning system being trained using at least one of data representing a plurality of training images and data representing one or more attributes regarding image presentation by the one or more entities, wherein the at least one of the plurality of training images is selectable for inclusion or exclusion by the one or more entities to present the selected image for training the machine learning system.

20. The one or more non-transitory computer readable media of claim 19, operations further comprising: further training of the machine learning system using data associated with another image selected for publication.

* * * * *